United States Patent [19]

Shibayama et al.

[11] Patent Number: 5,135,428
[45] Date of Patent: Aug. 4, 1992

[54] TOY VEHICLE HAVING AUTOMATIC TRANSMISSION

[75] Inventors: Kiyoshi Shibayama; Katsumi Kakizaki, both of Tokyo, Japan

[73] Assignee: Tomy Company, Ltd., Tokyo, Japan

[21] Appl. No.: 569,943

[22] Filed: Aug. 20, 1990

[30] Foreign Application Priority Data

Oct. 23, 1989 [JP] Japan .................... 1-23796

[51] Int. Cl.$^5$ .................... A63H 29/22; A63H 29/24
[52] U.S. Cl. .................... 446/463; 446/484; 446/471; 74/337; 192/48.91; 192/56 R
[58] Field of Search .................... 74/337; 192/54, 56 R, 192/48.6, 48.91, 48.92; 446/463, 462, 464, 457, 484

[56] References Cited

U.S. PATENT DOCUMENTS 4,141,256  2/1979  Wilson et al. .................... 446/463 X
4,241,534  12/1980 Larsson et al. .
4,333,261  6/1982  Jones et al. .
4,443,968  4/1984  Law .................... 446/462
4,545,451  10/1985 Pipa et al. .................... 74/337 X

FOREIGN PATENT DOCUMENTS 1150084  1/1958  France .................... 74/337
925964   5/1963  United Kingdom .
952133   3/1964  United Kingdom .

*Primary Examiner*—Mickey Yu
*Attorney, Agent, or Firm*—Staas & Halsey

[57] ABSTRACT

An automatic transmission for a toy vehicle includes a pinion having a driving side and a driven side and being fixedly coupled to a shaft, a high speed gear coupled to the pinion through a first clutch, and a low speed gear coupled to the pinion through a second, uni-directional clutch, wherein the second clutch slips in response to the first clutch being engaged to rotate the pinion at a relatively high speed, and wherein the first clutch slips when a predetermined force is applied to the driven side of the pinion, whereby the second clutch is engaged to rotate the pinion at a relatively low speed.

23 Claims, 4 Drawing Sheets

TOY VEHICLE HAVING AUTOMATIC TRANSMISSION

BACKGROUND OF THE INVENTION

1. Field of the Invention

The present invention relates generally to toy vehicles with drive motors, such as electric motors, and more specifically, to a toy vehicle having an automatic transmission for downshifting and upshifting automatically in response to changes in terrain or other loads placed on the vehicle.

2. Description of the Related Art

In the art of motorized toy vehicles, in the ordinary case, the vehicle has an axle driven by an electric motor (battery powered) through a transmission which essentially acts as a speed reducer. The transmission is usually geared for operation at a single gear ratio (the ratio of the engine rotational speed to the drive axle rotational speed).

An automatic shifting mechanism for a toy vehicle is described in Japanese Kokoku 54-35148. The transmission described therein enables the vehicle to either stop operation or run automatically in the event of the vehicle encountering an obstruction or some other external force which impedes motion of the vehicle. The transmission includes a pair of gears cooperatively and operatively interrelated such that one gear has a notch which receives a boss projecting from an opposing surface of the other gear. When a load is applied to the vehicle, the boss which was previously engaged with the notch is forced outwardly to cause the gear having the boss to move axially apart from the gear having the notch to effectively produce a shifted transmission.

The aforementioned shifting mechanism is suitable for a vehicle striking an obstacle but it is not very effective for a vehicle which is designed to run over obstacles, for example, for an off-road type toy vehicle.

SUMMARY OF THE INVENTION

An object of the present invention is to provide a toy vehicle with an automatic transmission capable of automatically downshifting and upshifting in response to changes in terrain or the meeting of obstacles.

Another object of the present invention is to provide a toy vehicle capable of operating in off-road conditions without damaging transmission and motor components.

Another object of the present invention is to provide a toy vehicle which is capable of being cleaned easily by having a detachably coupled body which is easily separable from a water-tight chassis.

These and other objects of the invention are met by providing an automatic transmission for a toy vehicle which includes a pinion having a driving side and a driven side and being fixedly coupled to a shaft, a high speed gear coupled to the pinion through a first clutch, and a low speed gear coupled to the pinion through a second, uni-directional clutch, wherein the second clutch slips in response to the first clutch being engaged to rotate the pinion at a relatively high speed, and wherein the first clutch slips when a predetermined force is applied to the driven side of the pinion, whereby the second clutch is engaged to rotate the pinion at a relatively low speed.

Thus, when the toy vehicle is run without a load applied thereto, such that the resistance to rotation of the axle is low, relatively speaking, the driving force of the motor is transmitted through the high speed gear, and the low speed gear is allowed to slip and becomes effectively disengaged when the high speed gear is engaged. When the toy vehicle encounters a resistance to rotation, such as the vehicle climbing a steep grade or driving through a highly viscous fluid (such as mud) or when the vehicle encounters an obstacle, and a predetermined resistance to rotation of the axle is thereby achieved, the first clutch allows the high speed gear to become disengaged and the low speed gear no longer slips so that the drive train passes through the low speed gear and bypasses the high speed gear. The effect is to increase the torque applied to the axle while reducing the speed of the vehicle, thereby resulting in an automatically shifted transmission.

DETAILED DESCRIPTION OF THE PREFERRED EMBODIMENTS

Figure 1:
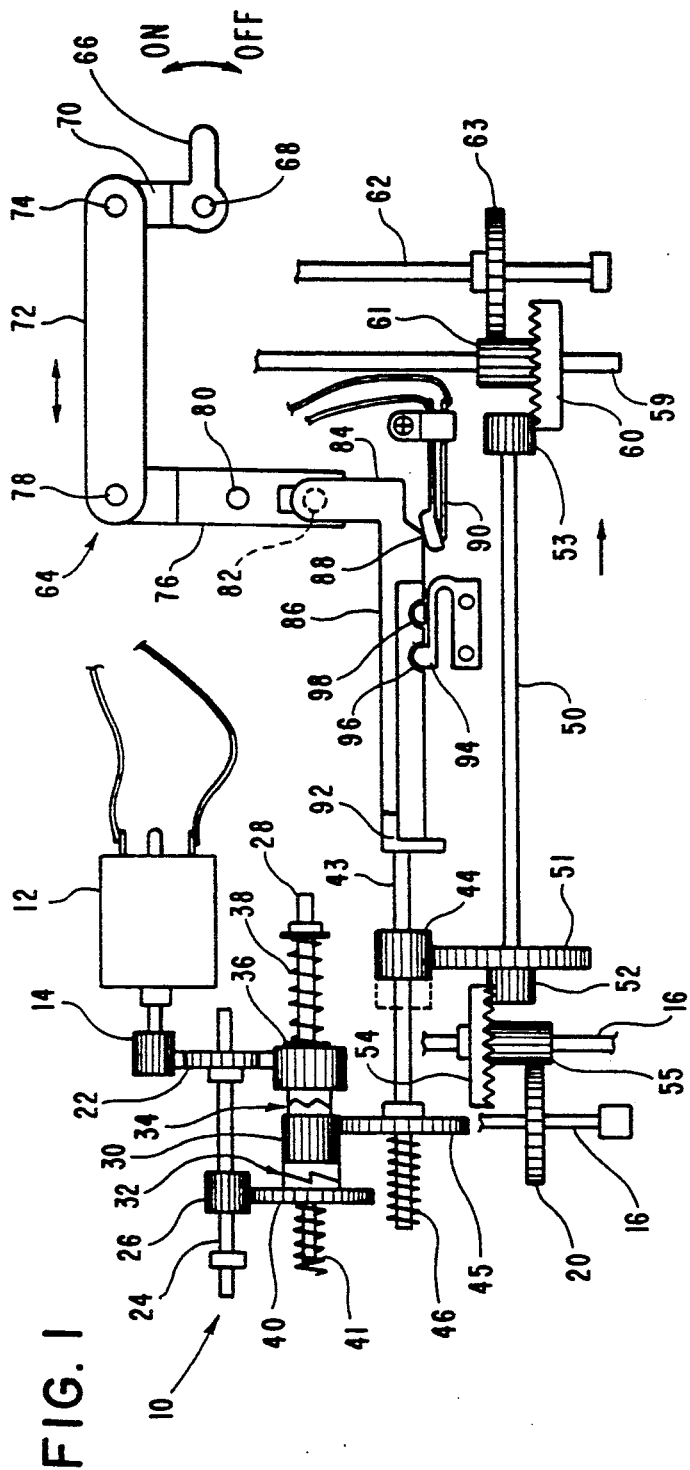
FIG. 1 is a top view showing an automatic transmission for a toy vehicle according to a preferred embodiment of the present invention.

Referring now to the figures, an automatic transmission according to the present invention is generally referred to by the numeral 10 and is operatively coupled between an electric motor 12 through its output pinion 14 to a driven axle 16, to thereby transmit torque from the motor 12 to the wheels 18 fixedly coupled to the axle 16. The axle 16 is driven by a spur gear 20 fixedly connected thereto, so that a gear train is defined by a plurality of gears disposed between and including the pinion 14 and the spur gear 20.

The motor output pinion 14 meshes with a spur gear 22 which is rotatable with a gear shaft 24. A second gear 26 is fixedly connected and rotatable with the shaft 24 such that both gears rotate simultaneously. Due to the small size of the components used in making a toy vehicle, all of the gears described herein can be made of molded plastic and, for example, the spur gear 22 has a diameter of fourteen millimeters. Thus, it is possible to form gears 22 and 26 as a single unit, having a hub extending between the two gears and integrally formed therewith. The shaft 24 is journalled inside the toy vehicle chassis by resting in U-shaped recesses formed in vertically upstanding supports, preferably integrally formed with the chassis.

A second gear shaft 28 is journalled in the chassis parallel to the first shaft 24. This shaft carries a pinion 30 which is fixedly connected thereto for rotation therewith. The pinion 30 has two clutches 32 and 34 disposed on opposite sides thereof to effect a high speed/low speed automatic gear shifting function.

The gear 22 meshes with a gear 36 which is rotatably mounted on the shaft 28. The gear 36 is coupled to the pinion 30 through the clutch 34, which includes two meshing parts 34a and 36a, with part 34a being a cylindrical hub coaxial and fixedly connected to the pinion 30, while part 36a is coaxial and fixedly connected to gear 36. The two parts 36a and 34a are urged into meshing engagement by a spring 38. Thus, when the clutch 34 is engaged, the pinion 30 is rotated by the gear 36, which constantly meshes with gear 22 which is driven by the output pinion 14 of the motor 12. The opposing surfaces of the clutch parts 34a and 36a zig-zag at a constant pitch so that the clutch 34 is capable of bi-direction slipping once the spring force of spring 38 is overcome by the torque applied to the gear 36 from the output pinion 14.

Gear 40 is rotatably mounted on the shaft 28 and meshes with the gear 26. The clutch 32, similarly to the clutch 34, includes two meshing parts 30b and 40a, as well as a spring 41. Spring 41 has a smaller spring force than the spring 38. Clutch part 30b is formed integrally and coaxially with the pinion 30, whereas clutch part 40a is formed integrally and coaxially with gear 40. When the clutch 34 is engaged, so that the pinion 30 is rotating with the gear 36, and since the spring force of spring 41 is less than the spring force of spring 38, the clutch 32 will slip, whereby clutch part 30b rotates faster than clutch part 40a, thereby causing the gear 40 to move axially along the shaft 28 and along the splines (or elongated gear teeth) of gear 26. Thus, the gear 26 constantly meshes with the gear 40, and the gear 22 constantly meshes with the gear 36. However, due to the fact that the gear 22 is larger than gear 26, and since gear 36 is smaller than gear 40, the gears 36 and 40 will rotate at different speeds. Since both gears 26 and 22 rotate constantly, the two clutches 32 and 34 have to permit alternative engagement of the gears 36 and 40. When the gear 36 is engaged by engagement of the clutch 34, the transmission is operating in a high speed mode, but when the clutch 34 is disengaged, the other clutch 32 must be engaged to permit a low speed operational mode through gear 40. This is facilitated by making clutch 32 a uni-directional clutch, in that the pattern of the opposing surfaces of the two meshing parts 40a and 30b permit the two parts to become locked when the gear 40 rotates in one direction, so that the pinion 30 rotates with the gear 40.

A third shaft 43, parallel to shafts 28 and 24, is rotatably mounted in the chassis in a manner similar to the mounting of the other shafts. The shaft 43 has fixedly mounted thereto for rotational movement therewith a pinion 44 and a gear 45, which meshes with the pinion 30. The shaft 43 is urged to the right-hand direction of FIG. 1 by a spring 46 which pushes against the side of the gear 45. In its normal position, which is to be spring biased to the right, the pinion 44 meshes with a gear 51 which is fixedly connected to a fourth gear shaft 50 which carries at opposite ends thereof pinions 51 and 53. Pinion 52 meshes with a gear 54 which is integrally formed and thus rotatable with a pinion 55. Pinion 55 meshes with the gear 20 which drives the axle 16.

In order to have four-wheel drive, the pinion 53 at the opposite end of the shaft 50 meshes with a gear 60 mounted on a shaft 59. A pinion 61 is integrally formed with the gear 60 and is thus rotatable therewith. Pinion 61 meshes with gear 63 which is fixedly connected to the axle 62 so as to drive the wheels mounted on the axle.

A linkage mechanism 64 is used to simultaneously energize the electric motor 12 and uncouple a substantial portion of the transmission and the electric motor from the wheels of the vehicle. It is desirable to uncouple the transmission so that when the motor 12 is de-energized, the vehicle can be rolled or pushed without resistance from the motor and the clutch-coupled gears. The linkage mechanism includes an ON/OFF toggle switch 66, which is shown in the ON position in FIG. 1. The toggle switch 66 is pivotally mounted on a pivot pin 68. Since the toggle switch 66 is formed in the shape of a bell crank having a lever portion 70 which is pivotally connected to a linkage 72 at a pivot pin 74, clockwise rotation of the lever portion 70 causes the linkage 72 to translate in the right-hand direction. The linkage 72 is pivotally connected to a lever 76 at a pivot pin 78, and a lever 76 is pivotally mounted on a fixed shaft 80. Thus, as the linkage 72 translates to the right, the lever 76 is caused to rotate clockwise (viewed from FIG. 1). The lever 76 is pivotally connected by a pin 82 to a projection 84 integrally formed on an actuating arm 86. The arm 86 has a camming surface 88 which, in the ON position pushes two electrical contacts 90 into contact with each other so as to close an electrical circuit and thereby energize the electric motor 12. When the toggle switch is moved to the OFF position as described above, the actuating arm 86 translates to the left-hand direction and a forward end 92 which abuts an opposing end of the shaft 43 causes the shaft 43 to translate to the left along with the arm 86. The shaft 43 moves to the left a sufficient distance so that the pinion 44 becomes disengaged from the gear 51. Rotation of the gear 51 is responsible for driving both axles 16 and 62.

A spring detent 94 mounted on the chassis protrudes into one of two recesses 96 and 98 to hold the actuating arm in either of the ON or OFF positions. The spring detent 94 is biased towards the recesses and snaps into one or the other depending on the operated position of the arm 86.

Figure 3:
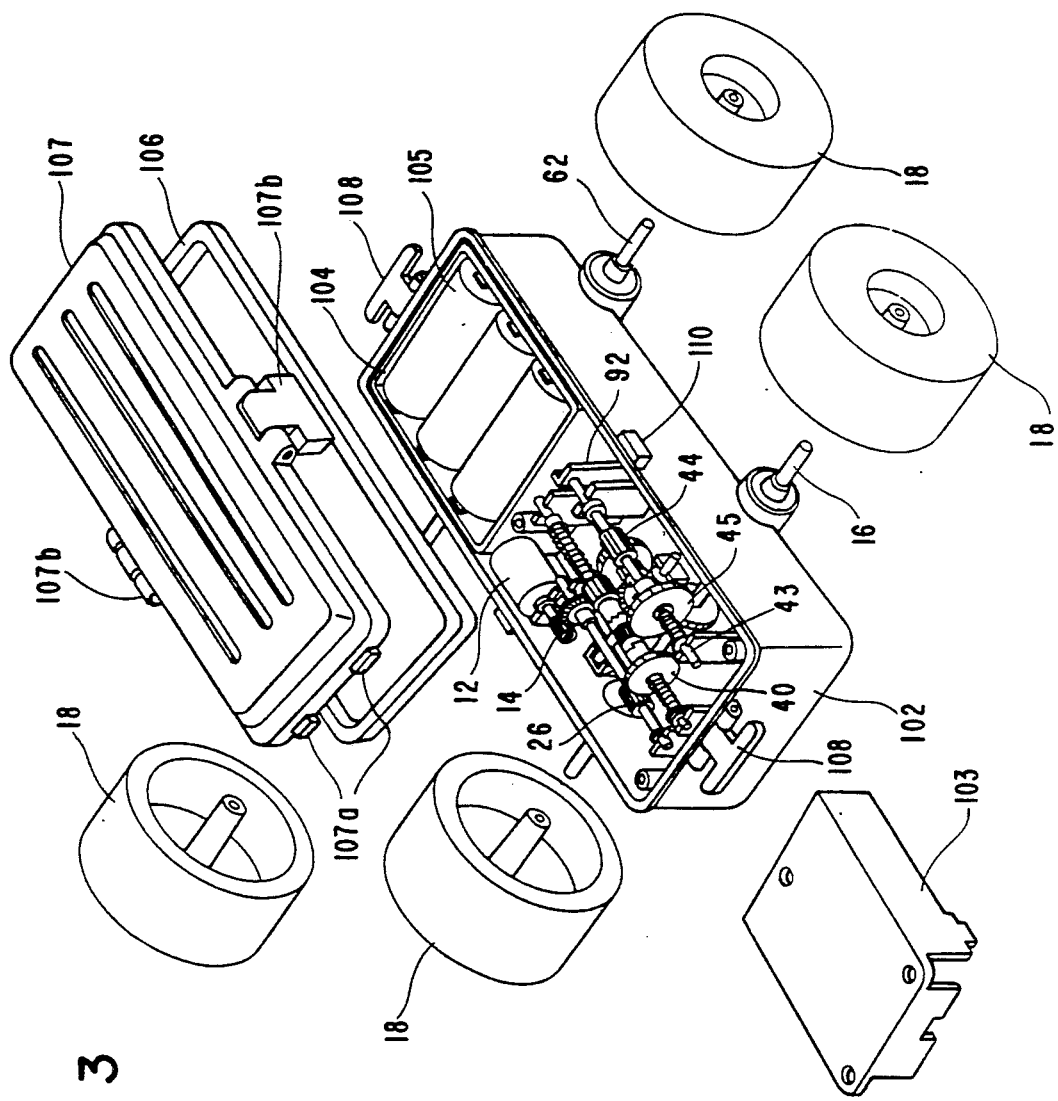
FIG. 3 is a perspective, partially exploded view of a toy vehicle according to the present invention, incorporating the transmission of FIG. 1.
Figure 4:
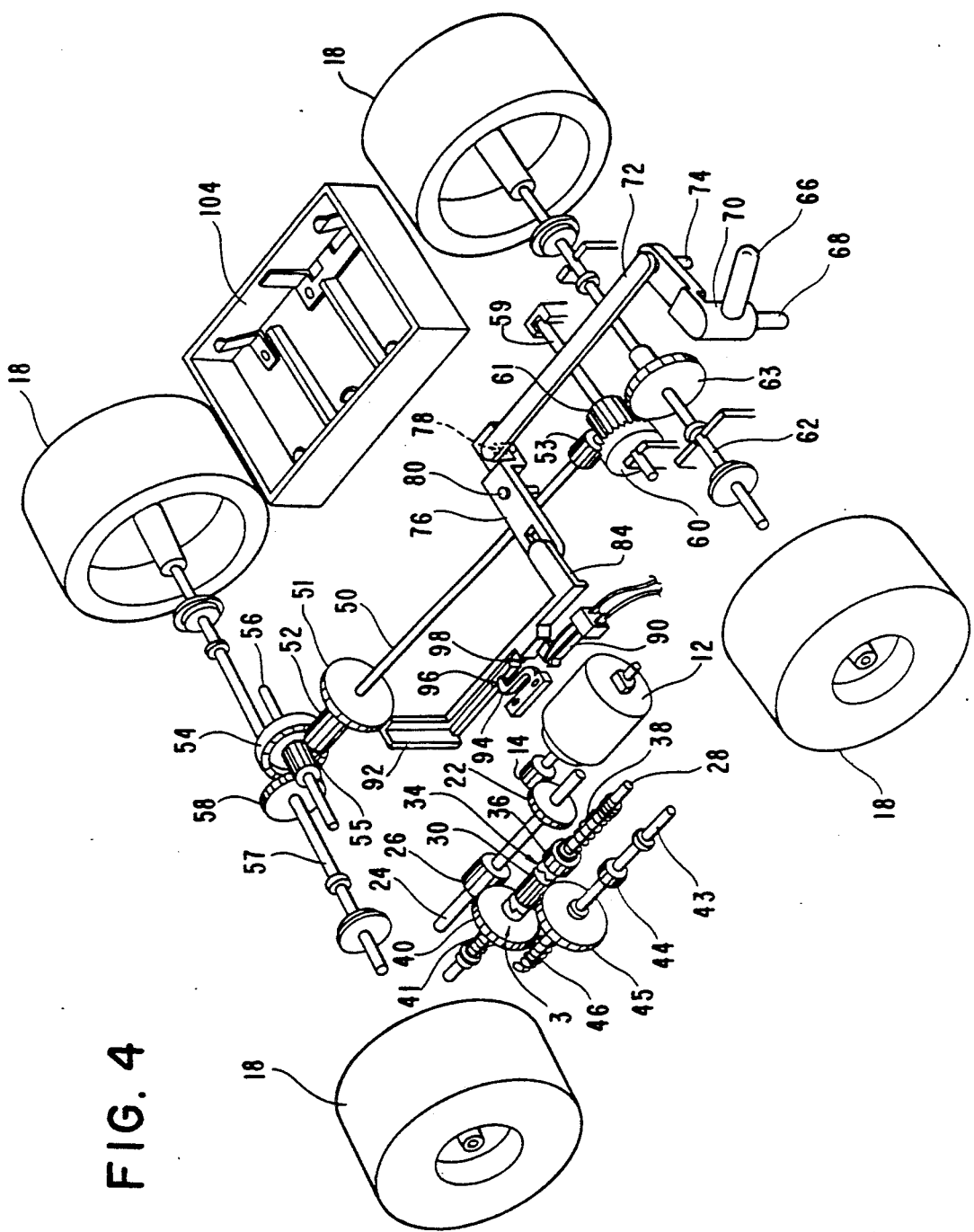
FIG. 4 is an enlarged perspective view, partially exploded, showing the transmission, drive axles and wheels of the toy vehicle according to the present invention.
Figure 5:
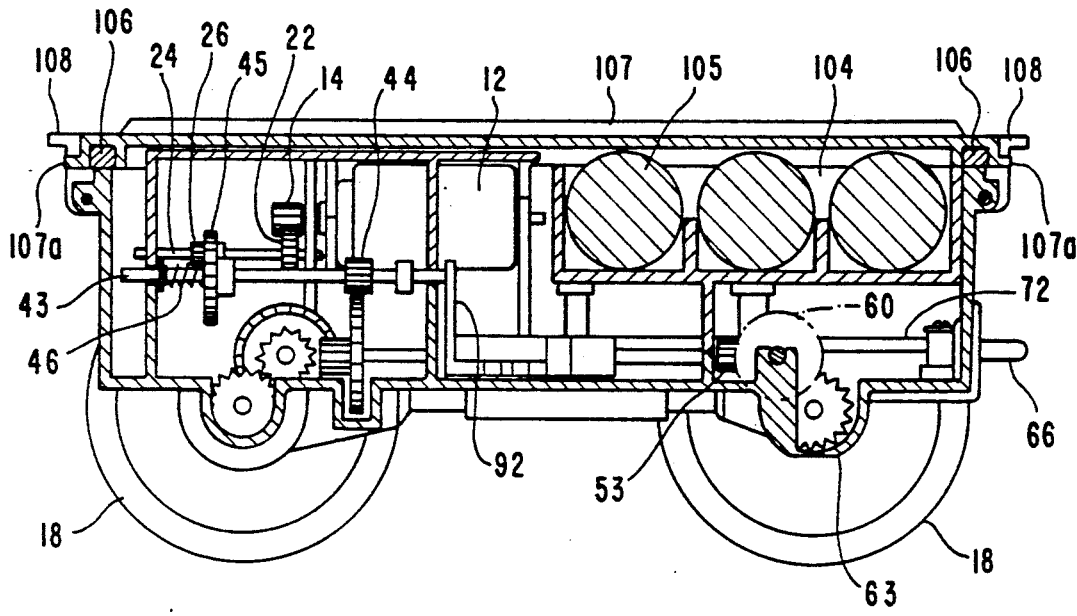
FIG. 5 is a vertical, longitudinal sectional view of the toy vehicle according to the present invention.

Referring to FIG. 3, a chassis 102 houses the gearing described above. A battery compartment 104 stores a plurality of batteries 105 as a power source for the electric motor 12. A cap 103 covers the various components of the transmission and holds the gear shafts in their respective upright supports. A rubber gasket 106 is fitted into a corresponding peripheral groove provided in a top 107 which is clamped over the open upper end of the chassis 102 by means of pivotally mounted catches 108 which snap-fit over projections 107a provided on the top 107. Moreover, catches 107b snap-fit on projections 110 of the chassis 102.

Figure 6:
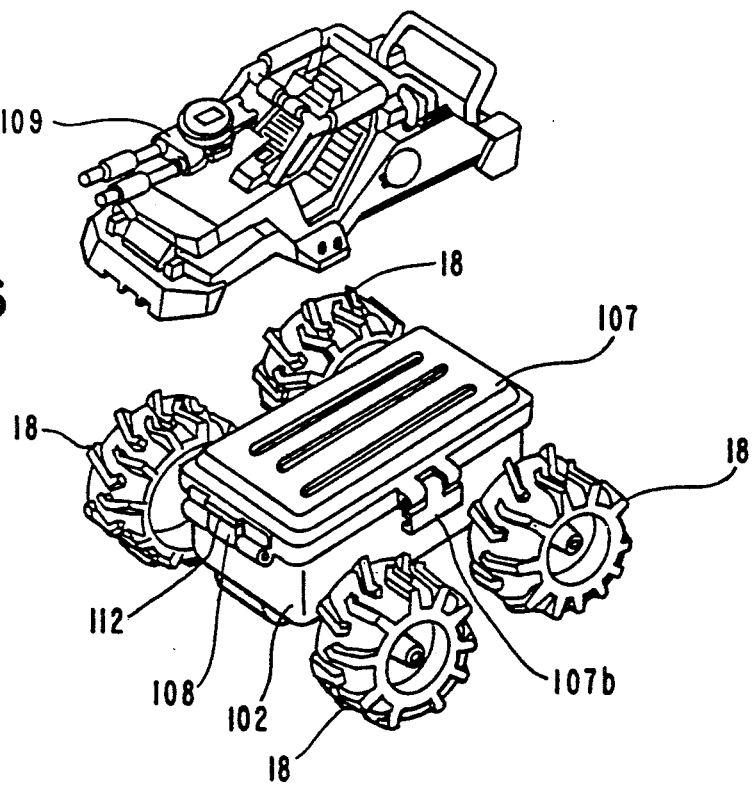
FIG. 6 is a perspective view, partially exploded, showing the toy vehicle according to the present invention, including its detachable body.

As shown in FIG. 6, a body 109 is detachably coupled to the top of the chassis by means of projections 112 that are disposed on the axial ends of the top 107 and received in corresponding ends of the body 109.

As described above, the toggle switch 66 is moved to the ON position to begin operation of the toy vehicle, at which time, the end 92 of the actuating arm 86 is pulled away from the end of the gear shaft 43 so that the gear shaft moves to the right as shown in FIG. 1 to engage the pinion 44 with the gear 51, thus coupling the electric motor and a substantial portion of the transmission to the remaining drive gears associated with the two axles 16 and 62. At the same time, the electrical contacts 90 are caused to close by movement of the arm 86. At this point, the electric motor 12 is energized and the output pinion 14 is caused to rotate at a relatively high speed. The pinion 14 rotates gear 22 and pinion 26 which are fixedly mounted on the shaft 24. When the driving wheels 18 are on a smooth plane surface, thus producing a relatively small load, the clutch mechanism 34 is engaged due to the spring bias of spring 38 urging the two clutch parts 34a and 36a into meshing engagement. This leads to a high speed of rotation of the pinion 30. At the same time, the clutch 32 slips due to rotation of the clutch part 30b relative to the clutch part 40a.

Figure 2:
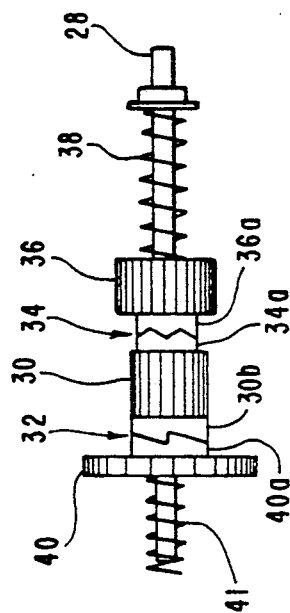
FIG. 2 is an enlarged top view showing the high speed and low speed gears and their respective coupling means used in the FIG. 1 embodiment.

When a sufficient load is applied such as the toy vehicle climbing a sufficiently steep incline, or passing through uneven terrain, the clutch piece 36a shifts to the right in FIG. 2 against the spring 38 so that the pinion 30 is no longer rotated by the gear 36. At this time, the uni-directional clutch 32 is engaged due to the rotation of the gear 40 by pinion 26. Thus, the pinion 30 is rotated at a lower speed, but higher torque by the larger gear 40.

When the driving wheels 18 overcome the obstacles, incline, or other terrain which creates a resistance to rotation at the wheels 18, the clutch 34 becomes engaged once again and the pinion 30 is caused to rotate at the higher speed.

The gear reduction which results from the aforementioned shifting from the high speed gear to the low speed gear is preferably about 1 to 5.

The time of gear shifting from high to low is a function of the spring force of the spring 38, which regardless of the absolute spring force must also be relatively greater than the spring force of the spring 41.

The gears and clutches mounted on shaft 28, as well as the springs 38 and 41 constitute a shifting mechanism which is responsive to the load placed on the "driven" side of the shifting mechanism. Pinion 14, gear 22 and pinion 26 are on the "driving" side of the shifting mechanism, while the remaining gears and pinions, beginning with gear 45 on the driven side. Gears 36 and 40 are intermittently coupled and decoupled to the pinion 30.

Numerous modifications and adaptations of the present invention will become apparent to those so skilled in the art and thus, it is intended by the following claims to cover all such modifications and adaptations which fall within the true spirit and scope of the invention.

What is claimed is:

1. An automatic transmission for a toy vehicle comprising:
    a pinion having a driving side and a driven side, two opposite ends and being fixedly coupled to a shaft;
    a high speed gear coupled to one end of the pinion through a first clutch; and
    a low speed gear coupled to the other end of the pinion through a second, uni-directional clutch, wherein the second clutch slips in response to the first clutch being engaged to rotate the pinion at a relatively high speed, and wherein the first clutch slips when a predetermined force is applied to the driven side of the pinion, whereby the second clutch is engaged to rotate the pinion at a relatively low speed.

2. An automatic transmission according to claim 1, wherein the first clutch includes a first clutch part fixedly connected to the high speed gear, a second clutch part fixedly connected to the pinion, the first and second parts having meshing end surfaces biased into engagement by a spring.

3. An automatic transmission according to claim 2, wherein the second clutch comprises a first clutch part fixedly connected to the pinion and a second clutch part fixedly connected to the low speed gear, the first and second parts of the second clutch having meshing end surfaces biased into engagement by a spring.

4. An automatic transmission according to claim 3, wherein the spring of the first clutch has a greater spring force than the spring of the second clutch.

5. An automatic transmission according to claim 4, wherein the meshing end surfaces of the two clutch parts of the second clutch are shaped to permit one-way rotation.

6. An automatic transmission according to claim 1, further comprising a first driving side gear fixedly coupled to a second shaft and meshing with the high speed gear, and a second driving side gear fixedly connected to the second shaft and meshing with the low speed gear, the first driving side gear being drivable by a motor.

7. An automatic transmission according to claim 6, further comprising a first driven side gear fixedly connected to a third shaft and meshing with the pinion, a second driven side gear fixedly connected to the third shaft, and a spring for biasing the third shaft and the second driven side gear into engagement with an axle gear, the third shaft being axially movable against the spring by abutment with an actuating arm.

8. A toy vehicle comprising:
    a chassis having a rectangular box-like shape and an open top;
    first and second axles mounted in the chassis transverse a longitudinal axis of the chassis and passing through an interior of the chassis, each axle supporting wheels at opposite ends thereof;
    a motor mounted in the chassis and having a rotary output pinion;
    an axle drive gear fixedly connected to the first axle;
    and automatic transmission coupled between the rotary output pinion of the motor and the axle drive gear of the first axle for providing under various conditions a high speed low torque output and a low speed high torque output;
    a cover detachably coupled to the chassis over the open top for sealing the interior of the chassis;
    a body detachable coupled to the top of the chassis;
    a second axle drive gear fixedly connected to the second axle; and
    a drive line connecting the first and second axle drive gears so as to provide all wheel drive,
    wherein the drive line includes a drive shaft having first and second pinions disposed on opposite ends thereof and being fixedly coupled thereto, the drive shaft extending in the longitudinal direction of the chassis, a first crown gear meshing with the first pinion and a second crown gear meshing with the second pinion, each of the crown gears being rotatable on a shaft parallel to the first and second axles.

9. A toy vehicle comprising:
    a chassis having a rectangular box-like shape and an open top;
    first and second axles mounted in the chassis transverse a longitudinal axis of the chassis and passing through and interior of the chassis, each axle supporting wheels at opposite ends thereof;
    a motor mounted in the chassis and having a rotary output pinion;
    an axle drive gear fixedly connected to the first axle;
    an automatic transmission coupled between the rotary output pinion of the motor and the axle drive gear of the first axle for providing under various conditions a high speed low torque output and a low speed high torque output;

a cover detachably coupled to the chassis over the open top for sealing the interior of the chassis; and a body detachably coupled to the top of the chassis, wherein the automatic transmission comprises a pinion having a driving side, a driven side and two opposite ends and being fixedly coupled to a shaft, a high speed gear coupled to one end of the pinion through a first clutch, and a low speed gear coupled to the opposite end of the pinion through a second, uni-directional clutch, wherein the second clutch slips in response to the first clutch being engaged to rotate the pinion at a relatively high speed, and wherein the first clutch slips when a predetermined force is applied to the drive side of the pinion, whereby the second clutch is engaged to rotate the pinion at a relatively low speed.

10. A toy vehicle according to claim 8, wherein the first clutch includes a first clutch part fixedly connected to the high speed gear, a second clutch part fixedly connected to the pinion, the first and second parts having meshing end surfaces biased into engagement by a spring.

11. A toy vehicle according to claim 10, wherein the second clutch comprises a first clutch part fixedly connected to the pinion and a second clutch part fixedly connected to the low speed gear, the first and second parts of the second clutch having meshing end surfaces biased into engagement by a spring.

12. A toy vehicle according to claim 11, wherein the spring of the first clutch has a greater spring force than the spring of the second clutch.

13. A toy vehicle according to claim 12, wherein the meshing end surfaces of the two clutch parts of the second clutch are shaped to permit one-way rotation.

14. A toy vehicle according to claim 13, further comprising a first driving side gear fixedly coupled to a second shaft and meshing with the high speed gear, and a second driving side gear fixedly connected to the second shaft and meshing with the low speed gear, the first driving side gear being drivable by a motor.

15. A toy vehicle according to claim 14, further comprising a first driven side gear fixedly connected to a third shaft and meshing with the pinion, a second driven side gear fixedly connected to the third shaft, and a spring for biasing the third shaft and the second driven side gear into engagement with an axle gear, the third shaft being axially movable against the spring by abutment with an actuating arm.

16. A toy vehicle according to claim 8, further comprising a second axle drive gear fixedly connected to the second axle, and a drive line connecting the first and second axle drive gears so as to provide all wheel drive.

17. A toy vehicle according to claim 16, wherein the drive line includes a drive shaft having first and second pinions disposed on opposite ends thereof and being fixedly coupled thereto, the drive shaft extending in the longitudinal direction of the chassis, a first crown gear meshing with the first pinion and a second crown gear meshing with the second pinion, each of the crown gears being rotatable on a shaft parallel to the first and second axles.

18. A toy vehicle according to claim 17, where each of the first and second crown gears include pinions which mesh with the first and second axle drive gears.

19. A toy vehicle according to claim 8, further comprising an ON/OFF switch coupled to a linkage mechanism, the linkage mechanism actuating the motor and engaging the transmission in the ON position, and disengaging the transmission and de-actuating the motor in the OFF position.

20. A toy vehicle according to claim 19, wherein the motor is an electric motor, and the linkage mechanism includes a camming surface which closes a pair of electrical contacts when the switch is moved to the ON position.

21. A toy vehicle according to claim 20, wherein the linkage mechanism includes an actuating arm which abuts a gear shaft of the transmission, and moves a pinion mounted on the gear shaft into a disengaged position when the switch is moved into the OFF position.

22. A toy vehicle according to claim 15, further comprising an ON/OFF switch coupled to the motor and to the transmission through a linkage mechanism.

23. A toy vehicle according to claim 22, wherein the motor is an electric motor and the linkage mechanism includes a camming surface which closes a pair of electrical contacts when the ON/OFF switch is moved to the ON position, and wherein the linkage mechanism includes an actuating arm which abuts the third shaft and pushes the third shaft so as to disengage the second drive side gear when the ON/OFF switch is moved to the OFF position.

* * * * *

UNITED STATES PATENT AND TRADEMARK OFFICE
CERTIFICATE OF CORRECTION

PATENT NO. : 5,135,428

DATED : August 4, 1992

INVENTOR(S) : Kiyoshi Shibayama et al.

It is certified that error appears in the above-identified patent and that said Letters Patent is hereby corrected as shown below:

Column 6, line 35, "and" should be --an--;

line 42, "detachable" should be

--detachably--; and line 61, "and" should be --an--.

Signed and Sealed this

Twenty-sixth Day of October, 1993

Attest:

BRUCE LEHMAN

Attesting Officer  Commissioner of Patents and Trademarks